May 30, 1961
F. C. BAYER
2,986,152
FLOW CONTROL
Filed Jan. 20, 1956
5 Sheets-Sheet 3
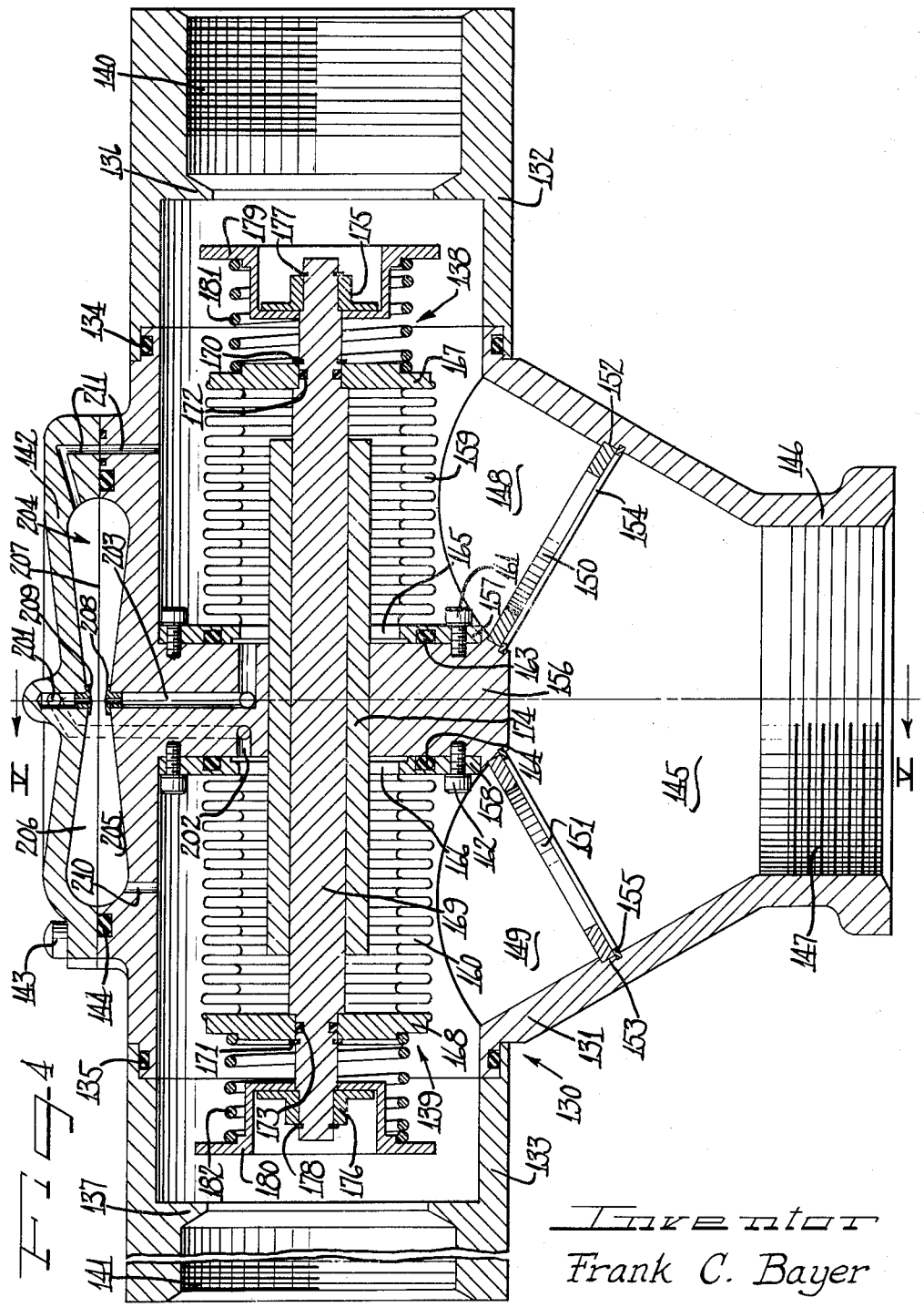
Inventor
Frank C. Bayer
Hill, Sherman, Meroni, Gross & Simpson Attys

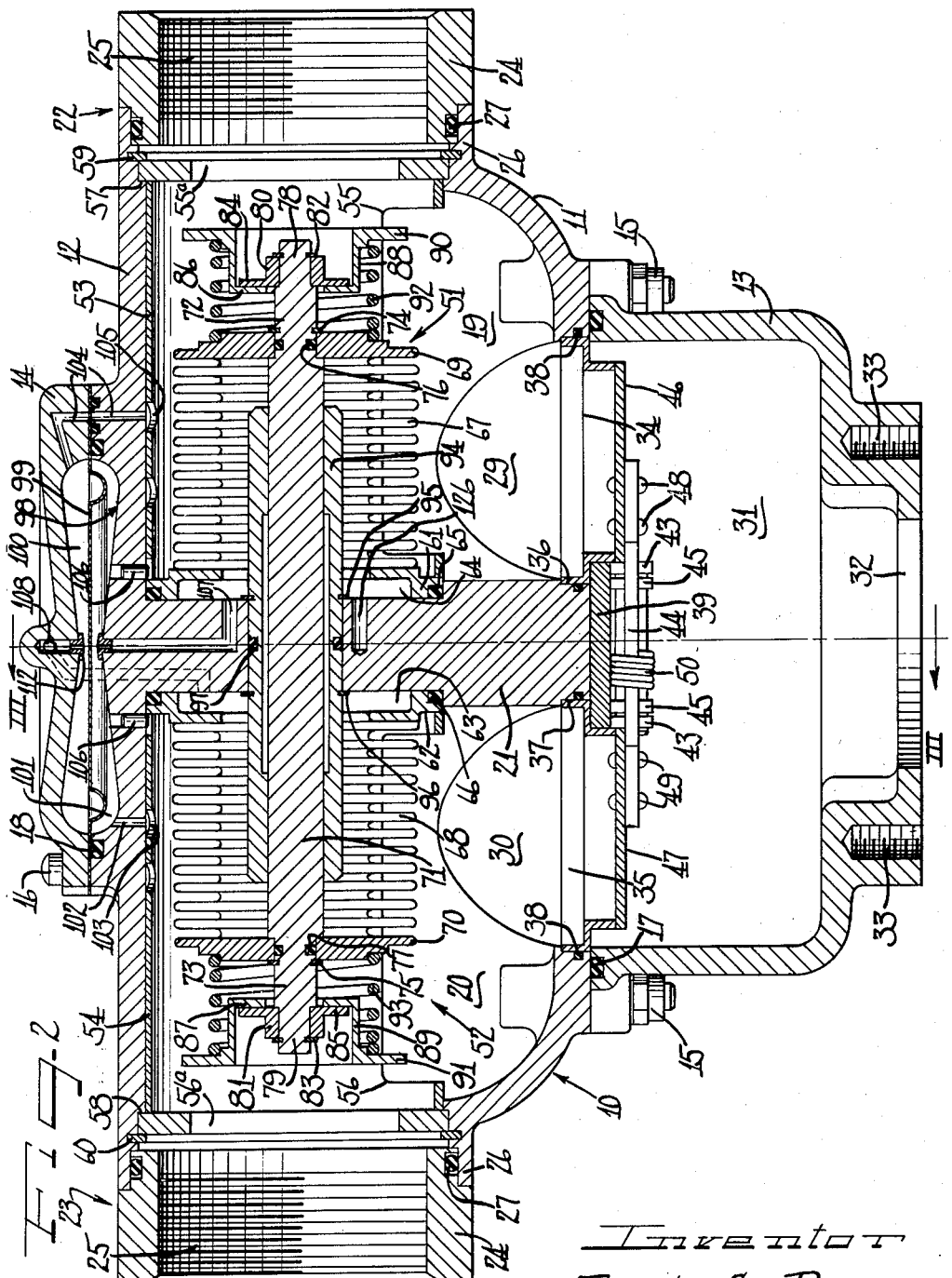

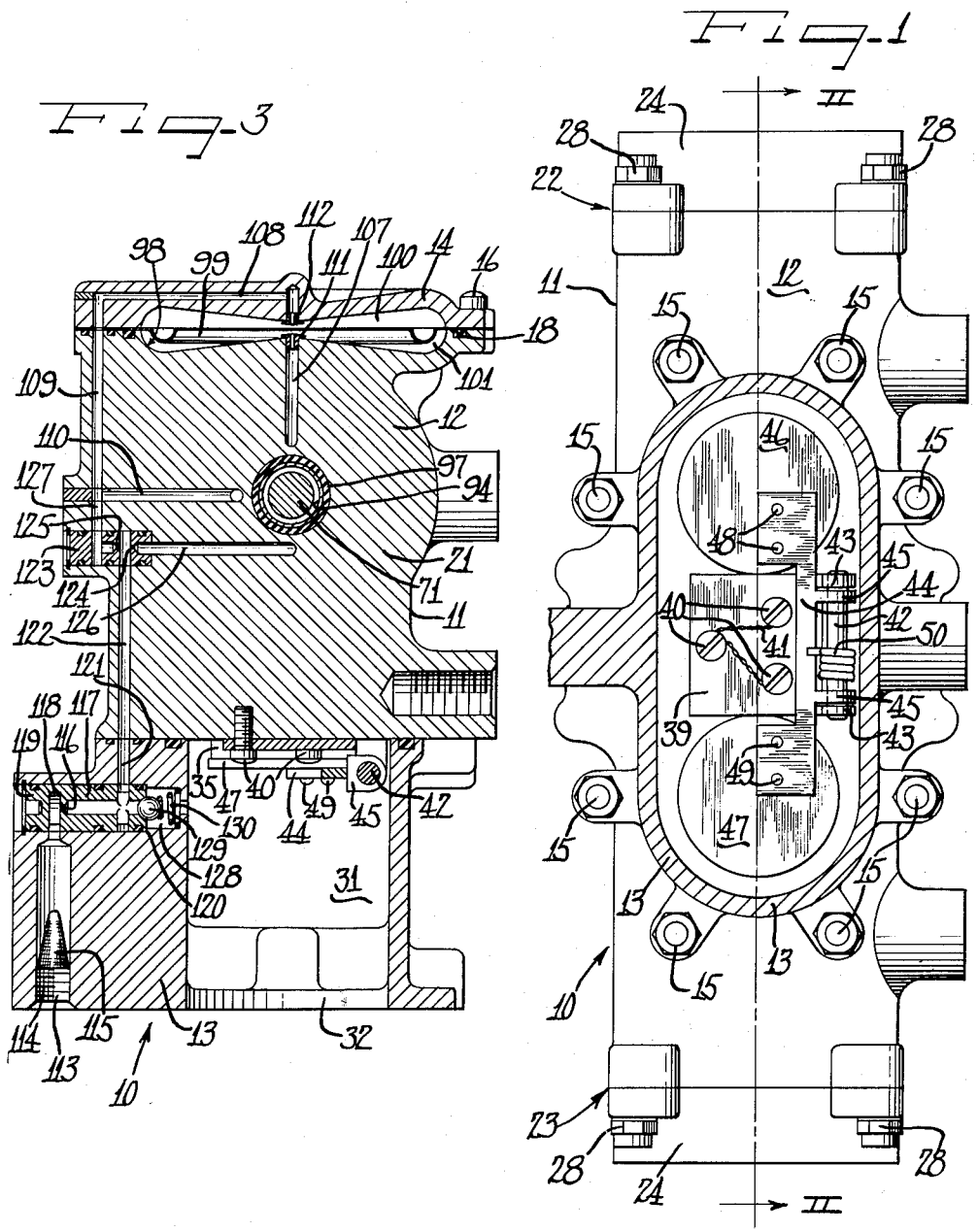

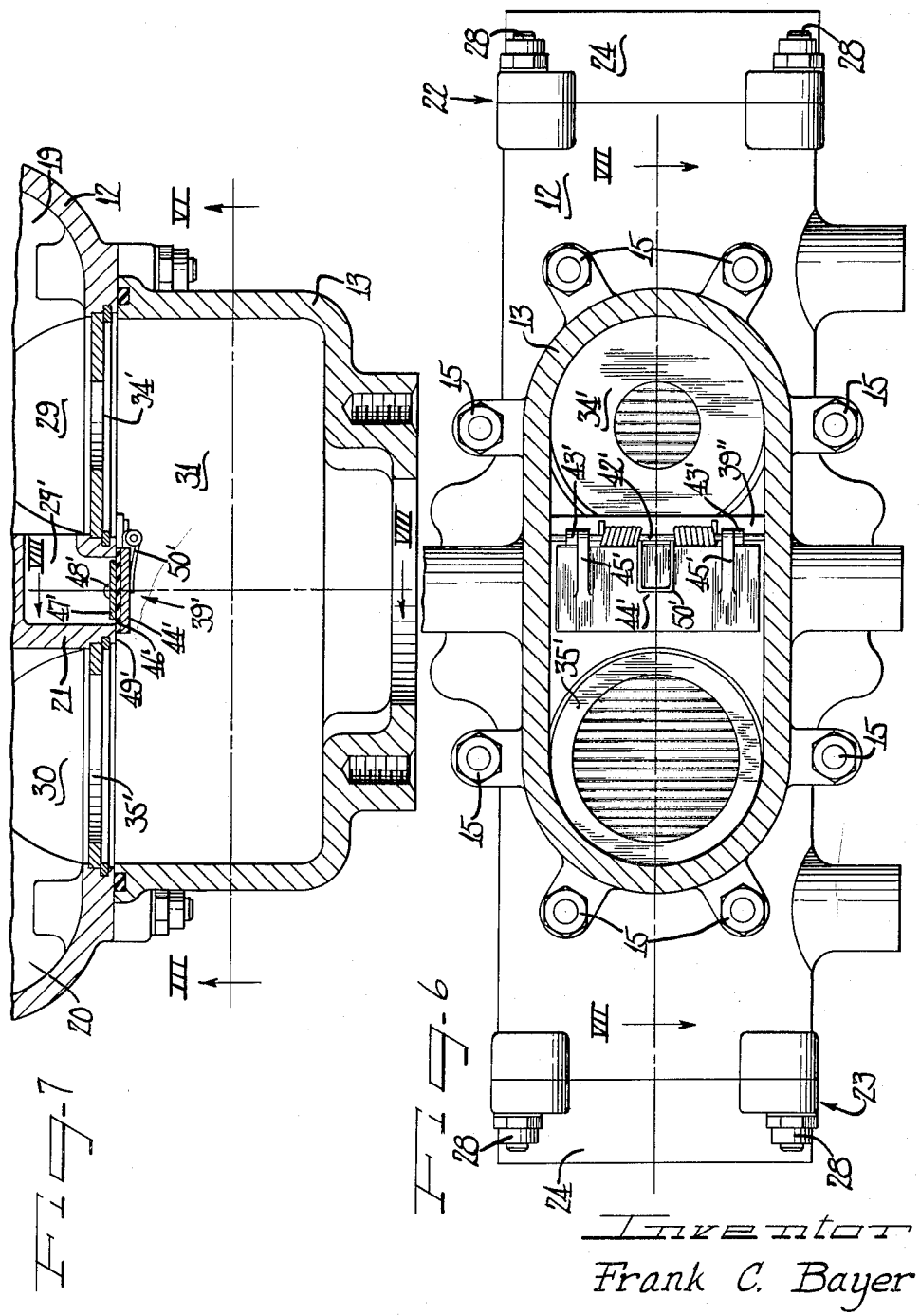

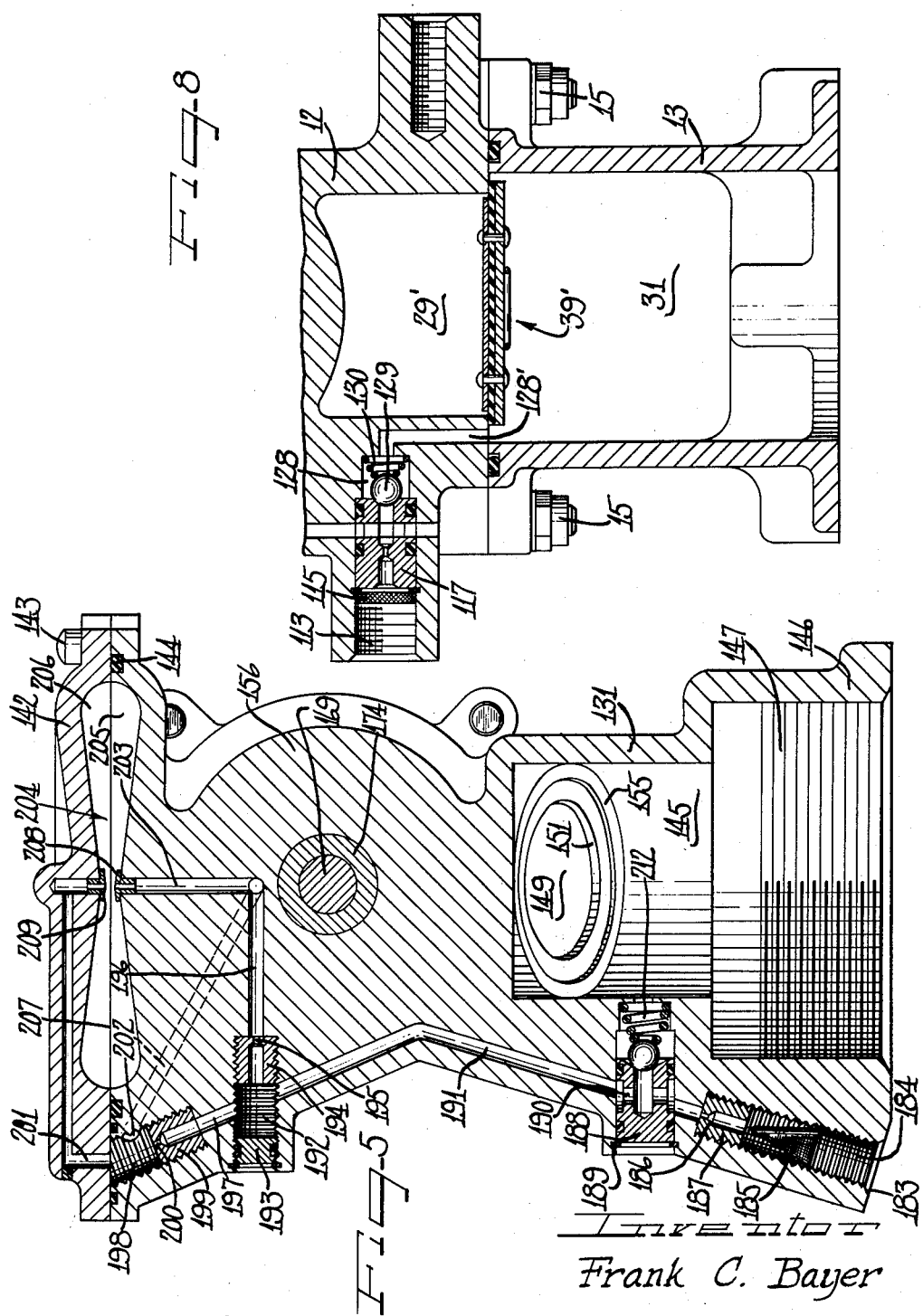

United States Patent Office

2,986,152
Patented May 30, 1961

2,986,152

FLOW CONTROL

Frank C. Bayer, Euclid, Ohio, assignor to Thompson Ramo Wooldridge Inc., a corporation of Ohio Filed Jan. 20, 1956, Ser. No. 560,347

10 Claims. (Cl. 137—99)

The present invention relates to flow control, and more particularly to flow control method and apparatus wherein fluid flow to or from a plurality of lines from or to a single fluid flow line are to be maintained substantially equal in the plurality of lines or at a predetermined ratio therefor.

While it will be appreciated that the principles and features of the present invention have general utility, embodiments thereof may have general or special utility as desired. In a particular installation where an embodiment of this invention may enjoy especially advantageous utility is in an aircraft powered by such means as a jet engine which is supplied with fuel from a pair of fuel tanks.

In such an installation it is important that the fuel tanks supply fuel to the engine at the same rate or at a predetermined proportion or ratio therebetween so that the tanks will be emptied at the same rate or at the predetermined proportion or ratio rate. To effect equalized or controlled proportion flow from the fuel tanks to the engine has been a serious problem in this field and attempted solutions of the problem have heretofore met with very little success. In addition to the lack of success of the heretofore known solutions, these prior solutions involved the utilization of extremely complicated systems and mechanisms which were not only highly expensive but also were quite heavy and utilized a very large number of components, all of which features were highly undesirable in an aircraft installation where compactness and minimum weight are most highly desired along with efficient and reliable operation and low cost.

By the principles of the instant invention, however, all of the aforesaid numerous other difficulties and undesirable features of flow control mechanisms and systems are obviated and there is provided a flow controller of the class described which is highly efficient, extremely reliable, is lightweight, is quite compact, and through its simplicity is economical both to manufacture and to maintain. In addition, it is an important feature of this invention to provide a flow control of this type which is operable over an extremely wide range of fluid pressures and fluid flow rates.

As an example, a flow equalizer embodying the principles of this invention for utilization inn an aircraft to control fuel flow therefor, may have a fuel flow range of from about 1000 p.p.h. (pounds per hour) per line to about 40000 p.p.h. per line with an inlet pressure of from about 34 p.s.i.g. (pounds per square inch gauge) per line to about 18 p.s.i.g. per line and a pressure difference up to about 5 p.s.i. (pounds per square inch).

On the other hand, a flow proportioner for a similar installation and embodying the principles of this invention with the flow from the two tanks maintained at a ratio of 3.6 to 1.0, an embodiment of this invention may have a fuel flow range of from 5 g.p.m. (gallons per minute) to about 130 g.p.m. with inlet pressures ranging from 22 p.s.i.g. to about 8 p.s.i.g. and an inlet pressure difference up to about 13 p.s.i. It will be understood, of course, that the foregoing is merely a description of exemplary ranges of embodiments of this invention and that no limitation thereon is intended by disclosing these examples and further that particular embodiments of this invention may be caused to have any desired ranges of pressure and flow characteristics.

In accordance with the principles of this invention, the flow equalizer or proportioner may be operative to control fluid flow either from a single feed line to a plurality of outlet lines to maintain equal or controlled proportioned flow through the outlet lines, or from a plurality of feed lines to a single outlet or discharge line and maintain substantially equal or controlled proportion flow from the plurality of feed lines. In the embodiments of the invention illustrated and described here, as exemplifying and embodying the principles of this invention, the flow equalizers and the flow proportioners are described as ones operative to control fluid flow from a plurality of feed lines to a single outlet line and maintain equal flow or controlled proportion flow through the feed lines.

In each of these embodiments a single housing holds all of the control mechanism and system components and is equipped with a pair of inlets thereto to be connected to feed lines to the respective fuel tanks and booster pumps. A single outlet on the housing is adapted for proper connection with a main fuel line to an injection pump for the engine. Within the housing, walls separate the inlet chambers from each other and from the outlet chamber, which chambers are provided in the housing for the inlets and the outlet. In the walls between each of the inlet chambers and the outlet chamber there is provided a metering orifice which orifices are of equal dimensions in the case of a flow equalizer and are of predetermined different dimensions in the case of a proportioner.

In accordance with this invention, if the pressure drops across the metering orifices are maintained equal then the flow through the orifices respectively will be equal when the orifices are of identical dimensions, or will be of the predetermined ratio when the flow orifices are of predetermined different dimensions. Since the pressure is the same on the outlet chamber side of all of the flow orifices, the described flow control may be effected by maintaining equal fluid pressures in the inlet chambers. To this end, the controller is equipped with a pair of bellows actuated valves set into the housing in a back-to-back arrangement with a single valve stem operable reciprocably to throttle the oppositely disposed inlets whereby proper placement and actuation of the valves will control fluid flow into the inlet chambers to maintain substantially equal pressures in those chambers.

To effect control of the bellows-actuated valves, the housing is further provided with a control fluid chamber which is sealingly divided by a flexible diaphragm into a pair of pressure chambers from which passages extend to the inlet chambers respectively and to the bellows actuators for the valves respectively such that the first and second pressure chambers are in fluid communication with the first and second inlet chambers respectively and further in fluid communication with the second and first bellows actuators respectively. At the pressure chamber extremities of the passages between the pressure chambers and the bellows, there are provided pressure relief or vent members which are disposed adjacent to the flexible diaphragm and act as control fluid flow restrictors such that flexure of the diaphragm due to differing pressures on opposite sides thereof from the inlet chambers will cause opening and/or closing of the respective vents to thereby increase or decrease control fluid pressure in the bellows respectively. Control fluid at a higher pressure than the pressure of fluid in the inlet chambers is admitted into the mechanism through a control fluid inlet having a filter therein through which the fluid passes to a restriction which operates to somewhat reduce the control fluid pressure yet leave the same substantially higher than fluid pressure in the inlet chambers. From the aforementioned restriction, control fluid passes to second restrictions leading to the respective bellows actuators for the valves. In addition to the foregoing, the mechanism is provided with an overpressure relief valve for the control fluid with a biasing means to limit the difference between control fluid pressure and fuel pressure at the outlet chamber.

Thus, it will be readily understood that an important object, feature and advantage of the present invention is to provide a new and improved flow control for flow equalization or flow proportioning.

Another object of the present invention is to provide a new and improved flow equalizer and/or proportioner operative to maintain equal or controlled proportioned flow through a plurality of lines with substantially all fluid also passing through another line connected to the equalizer and/or proportioner.

Still another object of the present invention is to provide a new and improved flow control mechanism with a main line and a plurality of branch lines and valve means in each of the branch lines controlled by fluid pressure sensing means to maintain substantially equal and/or proportioned fluid flow in the branch lines.

Still another object of the present invention is to provide a new and improved flow controller to maintain controlled equal or proportional fluid flow from a plurality of feed lines to a main line and including a housing having an outlet to the main line and a plurality of inlets from the feed lines respectively with means to sense fluid pressure at each of the inlets and valve means at each of the inlets controlled by the fluid pressure sensing means to maintain substantially equal fluid pressure at the inlets.

Still another object of the present invention is to provide a new and improved flow control mechanism to control fluid flow from a plurality of feed lines to a main line and including a housing having a plurality of inlets to the housing to be connected to the feed lines and an outlet from the housing to be connected to the main line with walls in the housing defining individual chambers therein for said inlets respectively, and orifice means communicating each of the chambers with the outlet and pressure-sensing valve means operative to maintain fluid pressure in the chambers substantially equal and thereby maintain fluid flow through the orifice means at a predetermined ratio therebetween.

Still another object of the present invention is to provide a new and improved flow control mechanism to control fluid flow from a plurality of feed lines to a main line and including a housing having a plurality of inlets thereto to be connected to the feed lines and an outlet therefrom to be connected to the main line, with walls in the housing defining individual chambers therein for the inlets respectively and further including a reference or control fluid inlet to the housing with a reference fluid chamber therein and a plurality of flow paths between the reference fluid inlet and the reference fluid chamber and a flow path from each of the individual inlet chambers to the reference fluid chamber, and a reference fluid control member in the reference fluid chamber controlled by fluid from each of the inlet chambers, and valve means and a valve assembly to control fluid flow into each of the individual inlet chambers from the inlets with said valve means being controlled by reference fluid as controlled at the reference fluid chamber to maintain fluid pressure in the individual inlet chambers substantially equal.

Yet another object of the present invention is to provide a new and improved flow controller to maintain controlled fluid flow from a pair of feed lines to a main line and including a housing having an inlet to the main line and a pair of outlets from the feed lines respectively, and a pair of inlet fluid chambers in the housing for the inlets respectively, an outlet fluid chamber in the housing for the outlet, a flow orifice between each of the inlet chambers and the outlet chamber, a bellows operated valve in each of the inlet chambers, a common valve stem for the bellows operated valves, a control fluid chamber in the housing, a flexible diaphragm in the control fluid chamber sealingly dividing the same into a pair of pressure chambers, a pair of pressure relief nozzles in the pressure chambers, respectively, to be variably opened and closed by flexure of the diaphragm, a pair of fluid passages from the inlet chambers to the pressure chambers, respectively, a control fluid inlet in the housing, control fluid passages in the housing from the control fluid inlet to the bellows operated valves respectively and passages from the bellows-operated valves to the pressure relief nozzles whereby fluid pressure in the inlet chambers effects control of the bellows-operated valves to maintain substantially equal pressure drops across the flow orifices and substantially equal proportioned flow through the said pair of inlets.

Still other objects, features and advantages of the present invention will become readily apparent from the following detailed description of the present invention and embodiments thereof, from the claims, and from the accompanying drawings in which each and every detail shown and illustrated is fully and completely disclosed as a part of this specification, in which like reference numerals refer to like parts and in which:

Fig. 1 is a partially sectioned bottom plan view of a flow equalizer embodying the principles of this invention;

Figure 2 is a sectional view of the flow equalizer of Figure 1 viewed as taken substantially along the line II—II of Figure 1;

Figure 3 is a sectional view of the flow equalizer of Figures 1 and 2 and is viewed substantially as taken along the line III—III of Figure 2;

Figure 4 is a sectional view of another flow equalizer embodying the principles of the instant invention and resembles Figure 2;

Figure 5 is a sectional view of the flow equalizer of Figure 4 and viewed as taken substantially along the line V—V of Figure 4;

Figure 6 is a partially sectioned bottom plan view of a flow porportioner embodying the principles of this invention;

Figure 7 is a fragmental sectional view of the proportioner of Figure 6 viewed as taken substantially along the line VII—VII of Figure 6; and Figure 8 is a fragmental sectional view of the proportioner of Figures 6 and 7 viewed as taken substantially along the line VIII—VIII of Figure 7.

As shown on the drawings:

There is illustrated in Figures 1, 2 and 3 several views of a flow equalizer embodying the principles of this invention and operative as a single flow control mechanism to maintain substantially equal flow rates in branch feed lines from fuel tanks and booster pumps to the main fuel supply line for a turbojet engine for an aircraft, as an exemplary utilization and embodiment of the principles of this invention and not as any limitation on the scope of this invention. The flow equalizer 10 of Figures 1, 2 and 3 is a single assembly having a housing 11 formed of a main housing block 12, an outlet chamber block 13, and a control fluid chamber block 14, the latter two of which are assembled to the main housing block 11 by screws or the like 15 and 16 which assemble the parts of the housing 11 together and "O" rings or the like 17 and 18 between the housing members 12, 13 and 14 to provide a fluid tight seal therebetween.

Since this embodiment of the invention is to be utilized with a pair of feed lines leading from a pair of fuel tanks with their associated booster pumps, the first housing section 12 is provided with a pair of inlet chambers 19 and 20 which are isolated from each other by a central wall 21 formed as an integral part of the housing section 12. These inlet chambers 19 and 20 are in fluid communication with inlet assemblies 22 and 23, respectively, providing inlets into the housing and particularly into the inlet chambers 19 and 20, respectively. Each of the inlet assemblies 22 and 23 is provided with an appropriately apertured and internally threaded fluid line coupling 24—24, internally threaded as at 25—25 for connection with a fluid feed line, which is sealed in an inlet apertured boss 26—26 of an "O" ring 27—27 and securely mounted and fixed in place by such convenient means as screws or the like 28—28.

The housing section 12 is provided with a pair of apertures 29 and 30 respectively leading from the inlet chambers 19 and 20 to an outlet chamber 31 in the outlet chamber block 13 for fluid flow from the inlets 22 and 23 to the outlet 32 at the bottom of the outlet chamber block 13 which block is provided with means such as threaded recesses 33—33 for securing an outlet or discharge line thereto for fluid flow from the flow equalizer 10. In each of the apertures 29 and 30 there is provided a flow metering orifice disk or plate or block 34 and 35, respectively, which, in the instant embodiment of the invention, are of identical dimensions and configurations so that with equal pressure drops thereacross there will be equal flow therethrough from the inlet chambers 19 and 20 to the outlet chamber 31. These orifice members 34 and 35 are set in annular recesses 36 and 37 in the apertures 29 and 30 and in the inlet block section 12 of the housing 11 and are sealed against fluid flow therearound by "O" rings or the like 38—38. Additionally, the orifice blocks 34 and 35 are securely mounted in place by being shouldered in the recesses 36 and 37 and by being abutted by the outlet or discharge chamber block 13 and a check valve mounting plate 39 secured to the inlet chamber separating wall 21 by such convenient means as screws or the like 40—40 which are locked after being set in position by lock wire 41.

The mounting plate 39 also carries a hinge pin 42 fixed in a pair of ears 43 on the mounting plate 39 for pivotally mounting a hinge plate 44 which has a pair of spaced ears 45—45 thereon pivotally receiving the hinge pin 42. At the ends of the hinge plate 44, a pair of check valve disks or plates 46 and 47 are secured thereon by such convenient means as rivets or the like 48 and 49, respectively. These check valve disks or plates 46 and 47 are thereby properly mounted and positioned to seat against the undersides or edges of the orifice blocks 34 and 35 simultaneously to thereby operate as a unitary check valve for both of the orifice members 34 and 35 in the apertures 29 and 30 between the inlet chambers 19 and 20 and the outlet chamber 31, respectively. A light coil spring 50 wrapped on the hinge pin 42 and having its ends respectively engaging the hinge plate 44 and the mounting plate 39, respectively biases the check valve assembly towards a closed position such as shown in Figures 1, 2 and 3. The spring has a sufficiently light tension therein, however, that a pressure differential between either of the inlet chambers 19 and 20 and the outlet chamber 31 will cause the check valve to open without serious impediment to the flow of fluid to the outlet chamber 31 from the inlet chambers and without any serious impediment to the operating characteristics of the flow controller 10.

Thus, with equal pressure drops across the orifices 34 and 35 there will be equal flow therethrough since the orifices are of equal dimensions and configurations and there will, therefore, be equal inlet flow from the feed lines and through the inlets 22 and 23. Since the discharge sides of both of the orifices 34 and 35 are at the same pressure by virtue of both thereof being in the outlet or discharge chamber 31, there will be equal pressure drops across the orifices and equal flow through these flow metering orifices when the inlet chambers 19 and 20 have the same fluid pressure therein.

To maintain the same fluid pressure in both of the inlet chambers 19 and 20, there are provided a pair of back-to-back mounted bellows-actuated valves indicated generally at 51 and 52 respectively disposed in the inlet chambers 19 and 20 and positioned to throttle the inlets 22 and 23, respectively.

To accommodate these valves, each of the inlet chambers is provided with a chamber sleeve such as the cylinder sleeves 53 and 54 which line the chambers 19 and 20, respectively, and are seated therein as hereinafter described in detail. It should be noted, however, that each of the sleeves is provided with an elongated axial aperture, as at 55 and 56, respectively, for fluid flow from the inlets 22 and 23 to the metering orifices 34 and 35. Immediately inwardly from the inlets 22 and 23, valve seats 55a and 56a are shouldered against shoulders 57 and 58 in the bosses 26 and against the outer ends of the cylinder sleeves 53 and 54. A pair of resilient snap rings 59 and 60 are fitted into recesses in the bosses 26 and positively hold the valve seats 55 and 56 and the cylinder sleeves 53 and 54 in proper axial position therefor.

The inner ends of the cylinder sleeves 53 and 54 abut against bellows mounting and sealing end plates or rings 61 and 62 which are secured in recesses 63 and 64 in the wall 21 and sealed against fluid flow therearound by O rings or the like 65 and 66, respectively.

These bellows end plates or rings 61 and 62 are sealingly assembled with actuating bellows 67 and 68, respectively, in the chambers 19 and 20 which in turn have their outer ends sealingly assembled with bellows outer end plates 69 and 70, respectively. The outer end plates 69 and 70 are then in turn securely mounted on and sealed to the single valve stem or pin or shaft 71 by being shouldered on intermediate reduced end portions 72 and 73 thereof, respectively, and fixed in place by resilient snap rings 74 and 75, respectively, and sealed by overlying O rings or the like 76 and 77, respectively. At the reduced outer ends 78 and 79 of the valve stem 71, there are carried thereon valve head retainers 80 and 81 which are secured in place against shoulders between the intermediate reduced portions and the end reduced portions of the valve stem 71 and snap rings or the like 82 and 83, respectively. These valve head retainers are radially flanged on the axial inner extremities thereof as at 84 and 85 to abut radially inwardly extending flanges 86 and 87 on the inner ends of valve head members 88 and 89 which have radially outwardly extending valve head flanges 90 and 91 on the outer ends thereof which are dimensioned to cooperate with the valve seats 55a and 56a to open and close the inlets 22 and 23. Resilient springs 92 and 93 are seated between the valve heads and the outer end plates 69 and 70 of the bellows to resiliently urge the valve heads 88 and 89 axially outwardly towards the valve seats 55a and 56a as limited by the valve head retainers 80 and 81. In conjunction with the discussion of the operation of the flow controller 10, the purposes of the resilient mounting for the valve heads will be discussed in detail.

It is to be noted, however, that since the valve stem 71 is a single valve stem for both valves, axial movement thereof will have the effect of increasing the flow through one of the inlets while decreasing the flow through the other thereof. Reciprocable axial movement of the valve stem 71 is facilitated by mounting the same in an elongated sleeve 94 having a minimum contact area with the stem 71 so as to minimize any friction therewith. The sleeve 94 is fixed to and mounted on the wall 21 in an appropriate aperture therein and snap rings or the like 95 and 96 retain the same in place while an O ring or the like 97 seals the sleeve and wall against fluid flow therebetween and through the aperture in the wall in which the sleeve 94 is mounted.

With this bellows-actuated valve structure, as described, the fluid pressures in the inlet chambers 19 and 20 may be maintained equal by so actuating the bellows 67 and 68 that the fluid entering the inlet chambers 19 and 20 through the inlets 22 and 23 and through the valve seats 55a and 56a will be controlled to maintain that condition.

To control actuation of the bellows 67 and 68 and thereby control actuation of the bellows-actuated valves 51 and 52, there is provided a fluid pressure sensing system to sense the fluid pressures in the inlet chambers 19 and 20 and to control the actuating or control or reference fluid pressures within the bellows 67 and 68 admitted thereto as hereinafter described.

As a part of this pressure sensing and bellows control system, the control chamber housing 14 and the housing body 12 cooperate to enclose a control fluid or reference fluid and pressure-sensing chamber 98 and sealingly secure a flexible diaphragm 99 therebetween which divides the chamber 98 into a pair of pressure chambers 100 and 101. A passage 102 in the housing body 12 provides for fluid communication between the pressure chamber 101 and the inlet chamber 20 and mates with an aperture 103 in the cylinder sleeve 54. Also, a fluid passage 104 in the housing body 12 and control fluid chamber housing section 14 provides for fluid communication between the inlet chamber 19 and the pressure chamber 100 and for that purpose mates with an aperture 105 in the cylinder sleeve 53. The sleeves 53 and 54 are retained in proper angular position for mating with the apertures therein with the passages immediately hereinabove described, by pins 106—106 set into the housing body 12 and the sleeves 53 and 54. By this arrangement of the chamber, diaphragm and passages, any fluid pressure difference between the fluid in the inlet chamber 19 and the fluid in the inlet chamber 20 will appear in the fluid pressure chambers 100 and 101 and across the flexible diaphragm 99 to flex the diaphragm axially upwardly or downwardly within the control fluid chamber 98, depending upon the direction of the fluid pressure differential.

This flexure of the diaphragm 99 will be effective to controllably bleed control fluid pressure in the bellows 67 and 68 to thereby change the relative pressures therein and thus controllably axially move the valve heads 90 and 91 until the pressures in the inlet chambers 19 and 20 are equal.

To bleed control fluid pressure from the bellows 67 and 68, there is provided a passage 107 in the wall 21 which provides for fluid communication between the interior of the bellows 67 and the pressure chamber 101. There is also provided a series of interconnected fluid passages 108, 109 and 110 (Figure 3) which provide for fluid communication between the interior of the bellows 68 and the fluid pressure chamber 109 and extend through the housing section 14 and the housing body 12. The passages from the interior of the bellows 67 and 68 extend into the pressure chambers 100 and 101 at axially opposed positions and are capped respectively with relatively small pressure relief nozzles 111 and 112 respectively which cooperate with the flexible diaphragm 99 so that flexure of the diaphragm easily controls pressure release from the bellows of the bellows actuated valve assemblies 51 and 52.

Control fluid is admitted into the bellows 67 and 68 at a somewhat higher pressure than the pressure in the inlet chambers 19 and 20 and is supplied to the bellows from a control or reference fluid inlet 113 in the discharge housing section 13. The fluid inlet 113 is appropriately threaded as at 114 for connection with a control fluid line which may be taken from the fuel supply pump to the engine when the assembly 10 is utilized as a fuel control for an engine as described hereinabove. A filter screen or the like 115 is provided in the control fluid inlet 113 to filter heavy contaminants, if any, from the control fluid whereby the bellows actuated valves 51 and 52 are supplied only with clean fluid so that the close fitting valve stem and sleeve, which are the only close fitting parts in the entire mechanism, will contact only clean uncontaminated fluid and be lubricated thereby rather than jammed or otherwise caused to be inoperative. Control fluid passes from the inlet 113 to a first pressure-reducing restriction 116 formed in a sleeve 117 fixed in the housing section 13 by a spacer 118 and a sealed block 119 holding the sleeve 117 against a shoulder 120 in an aperture in the discharge housing section 13. A passage in the sleeve 117 leads to communicating fluid passages 121 and 122 extending into the housing body 12 and to a restriction block 123 sealed in an appropriate recess in the housing body 12. This block 123 has a pair of opposed restriction orifices 124 and 125 therein operative to further reduce control fluid pressure and which respectively lead to a passage 126 feeding control fluid into the bellows 67, and a passage 127 communicating with the passages 109 and 110 for supplying control fluid into the bellows 68. An over-pressure relief valve 128 is provided between the first restriction sleeve 117 and the discharge chamber 31 and includes a ball valve 129 with a spring 130 biasing the ball of the valve against the outlet of the passage in the sleeve 117 with a force equal to the maximum permissible force to be developed against the ball 129 by fluid pressure in the passage between the restriction 116 in the sleeve 117 and the pair of restrictions 124 and 125 in the restriction block 123.

For a thorough understanding of the operation of the flow controller 10 described hereinabove in conjunction with Figures 1, 2 and 3, there is discussed hereinbelow an example of assumed operating conditions. As such an example of operating conditions, assume that the inlet pressure to inlet chamber 19 is greater than the inlet pressure to inlet chamber 20 as a result of higher supply pressure to the inlet 22 than the inlet supply pressure to the inlet 23. Under such conditions, the pressure drop across the orifice 34 will be greater than the pressure drop across the orifice 35 with a result that the flow rate through the orifice 34 will be greater than the flow rate through the orifice 35, which condition is undesirable since it indicates a greater flow rate through the inlet 22 than the flow rate through the inlet 23. The increased fluid pressure in the inlet chamber 19 will be supplied to the pressure chamber 100, while the lower fluid pressure in the inlet chamber 20 will be supplied to the pressure chamber 101 with a resulting pressure differential across the diaphragm 99 which will move the diaphragm or flex the diaphragm 99 towards the pressure relief nozzle 111 thereby effectively reducing the outlet area of the nozzle 111 and increasing the outlet area of the nozzle 112. This will have the effect of relatively increasing the control fluid pressure within the bellows 67 and, at the same time, exhausting or relatively decreasing fluid pressure from within the bellows 68. Generally, the effect will be to increase the pressure in the bellows 67 under these conditions to a possible maximum while tending to reduce the pressure in the bellows 68 to the fluid pressure in the inlet chamber 19. Such a differential in pressures between the bellows 67 and the bellows 68, which pressure differential may approach control fluid inlet pressure which is substantially higher than fuel inlet pressure from the feed lines, the bellows-actuated valves 51 and 52 are moved to the right, as viewed in Figure 2 and move the valve head 90 operatively toward the valve seat 55, while further opening the gap between the valve head 91 and the valve seat 56. This action continues until the pressures in the inlet chambers 19 and 20 and thereby the pressures in the pressure chambers 100 and 101 reach an equal quality or state of equilibrium and the diaphragm 99 is flexed towards a neutral or central position between the pressure relief nozzles 111 and 112. At this time then there will be equal fluid flow through the inlets 22 and 23 and equal fuel flow through the orifices 34 and 35 with equal pressure drops across the orifices. This equality of fuel flow will then have been restored with a minimum of pressure loss through the fuel branch line which supplies highly pressured fuel or other fluid into the mechanism as a control fluid since the restrictions 116, 124 and 125 prevent a high loss of fluid pressure at the inlet 113 therefor.

Additional important features to be noted here are that the maximum pressure which may be developed across the flexible diaphragm is the pressure drop across a metering flow orifice even in the event of failure of fluid pressure at either of the inlets 22 or 23 with a result that the diaphragm 99 cannot be subjected to excessive flexing pressures and therefore cannot be subjected to any pressure which might be sufficient to fracture the diaphragm. Additionally, in the event of failure of a booster pump, or any other cause for failure of fluid pressure at either of the inlets 22 and 23, which failure of fluid pressure will cause the bellows-actuated valves 51 and 52 to move towards a position throttling the inlet where fluid pressure remains, fluid flow will not stop completely and fluid pressure against the valve head will cause the same to move back against the biasing force of the spring holding the same to thereby admit fluid into the mechanism for flow therethrough. It will be understood, however, that the valves may be constructed to close completely. This latter feature of the invention is highly important particularly in such an installation as a military aircraft fuel flow system since there is a possibility of damage to one of the fuel tanks or fuel feed lines or booster pumps. It should be noted, however, that this possibility of damage is greatly reduced through the use of the instant invention since the assembly requires a minimum of space, is easily protected, and has a minimum of components all of which are compactly assembled in a single assembly thereby reducing the number of regions at which damage might occur that would have any damaging effect upon fuel flow to the engine of the aircraft.

In Figures 4 and 5 there is illustrated another flow equalizer having operating characteristics very similar to that of the flow equalizer of Figures 1, 2 and 3, while varying somewhat from the embodiment of Figures 1, 2 and 3 structurally. The physical construction of the flow controller of Figures 4 and 5 is of an even more highly simplified and economical character even though its operating characteristics are substantially the same as the structure of Figures 1, 2 and 3.

In the flow controller of Figures 4 and 5, the entire assembly is enclosed in a housing 130 having a housing body 131 having inlets 132 and 133 secured thereto in any convenient manner and sealed against fluid flow between the inlet and the housing body 131 by O rings 134 and 135, respectively. These inlet members have intermediate inwardly extending flanges 136 and 137 which form valve seats for the bellows-actuated valves 138 and 139. Additionally, the inlet members 132 and 133 are internally threaded as at 140 and 141 to provide for securing the same to feed lines as discussed above.

At the upper region of the housing body 131, a control fluid chamber housing cover 142 is secured thereto by any convenient means such as screws or the like 143 and sealed against fluid leakage by an O ring or the like 144. At the lower end of the housing body 131 it encloses a discharge or outlet chamber 145 leading to a discharge or outlet port 146 which is also internally threaded or the like as at 147 for fluid connection with a main line or discharge fluid line.

As in the structure of Figures 1, 2 and 3, the inlets provide for fluid feed into inlet chambers 148 and 149, respectively, which are in fluid communication with the outlet chamber 145 through flow metering orifices 150 and 151 which are secured in recesses 152 and 153, respectively, in the housing body 131 by snap rings or the like 154 and 155. When the structure of Figures 4 and 5 is utilized as a flow equalizer, the orifice members 150 and 151 will be substantially identically dimensioned and configurated so that with equal pressure drops thereacross there will be equal fluid flow therethrough. As discussed above, since the discharge sides of both of the metering orifices 150 and 151 are at the same pressure, there will be equal flow through the orifices when the fluid pressures in the inlet chambers 148 and 149 are equal. For maintaining the fluid pressures in the inlet chambers 148 and 149 equal, there are provided bellows-actuated valves 138 and 139 in the inlet chambers operative to move into throttling relationship with the seats 136 and 137 respectively and mounted on the housing body dividing wall 156. In this assembly, the inner end plates or rings 157 and 158 for the bellows 159 and 160 of the bellows actuated valves 138 and 139, respectively, are secured by screws or the like 161 and 162 to the side faces of the wall 156 and are sealed against fluid leakage therearound by O rings or the like 163 and 164, respectively. Apertures 165 and 166 in the mounting plates or rings 157 and 158 provide for control fluid flow into the bellows 159 and 160 which at their outer ends are sealed to outer end plates 167 and 168, respectively, which are in turn mounted on the single valve stem or piston or shaft 169 and secured in axial position thereon by snap rings or the like 170 and 171, respectively. These end plates are also sealed against fluid flow between the end plates and the valve stem 169 by O rings or the like 172 and 173, respectively. The valve stem 169 is slidably mounted in a sleeve 174 which is fixed to the wall 156 and slidably carries the valve stem 169 for axial reciprocable movement thereof.

At the outer ends of the valve stem 169, there is fixed thereon valve head stop members 175 and 176, respectively, secured in position by snap rings or the like 177 and 178 for retaining valve heads 179 and 180, respectively, which are biased outwardly by overtravel relief springs 181 and 182 seated between the valve heads and the outer end plates of the bellows 159 and 160.

The bellows 159 and 160 are supplied with control fluid from a control fluid inlet 183 adjacent to the discharge port 146, as seen in Figure 5, which inlet is threaded or the like as at 184 for connection to a control fluid line carrying control fluid at a somewhat higher pressure than feed line fluid pressure. Within the inlet there is provided a filter screen or cone 185 to remove contaminants and the like, if any, from the control fluid and when the control fluid passes through the filter screen 185 it flows to a first restriction 186 in a restriction block 187 threaded fully into the inlet 183. From the restriction 186, the control fluid passes through a by-pass valve block 188 secured in the housing body 131 by a snap ring or the like 189 and having a passage 190 therethrough to provide for fluid communication to a fluid passage 191 in the housing body leading to further passages and restrictions providing for control fluid flow to the bellows 159 and 160. In detail, the passage 191 leads to a first threaded passage 192 sealed by a plug 193 and carrying a restriction block 194 in which a restriction 195 provides for control fluid flow to a passage 196 leading to the interior of the bellows 159. From behind or upstream from the restriction block 194, control fluid flows to another passage 197 which leads to another threaded passage 198 carrying a further restriction block 199 having a restriction orifice 200 therein leading to the upper face of the housing body 131 and to a passage 201 in the control fluid chamber housing cap 142. The threaded passage 198 also is in fluid communication with a further passage 202 in the housing body 141 leading from the threaded passage 198 to the interior of the bellows 160 for control fluid flow into the interior of the bellows 160.

Now, controlled fluid pressure within the bellows 159 and 160 is controllably vented by a passage 203 leading from the interior of the bellows 159 and the passages 201 and 202 leading from the interior of the bellows 160. These passages lead to respectively diametrically opposed positions in a control fluid chamber 204 which is divided into a pair of pressure chambers 205 and 206 by a flexible diaphragm 207 cooperating with pressure relief nozzles 208 and 209 set into the passages 203 and 201, respectively, and projecting into the pressure chambers 205 and 206. Controlled flexure of the diaphragm 207 is provided by subjecting the opposite sides thereof to fluid pressure from the inlet chambers 148 and 149, respectively. This is effected by providing a passage 210 between the inlet chamber 149 and the pressure chamber 205 and providing a further passage 211 through the housing body 131 and control fluid chamber cap 142 for fluid communication between the pressure chamber 206 and the inlet chamber 148.

Any fluid pressure differential between the inlet chambers 148 and 149 will effect a fluid pressure differential and thereby a flexure of the diaphragm 207 to move the same toward either the nozzle 208 or the nozzle 209 to effect movement and throttling action of the bellows-actuated valves 138 and 139 to thereby equalize the fluid pressures in the inlet chambers 148 and 149 to provide for equal pressure drops across the orifices 150 and 151 and thereby equal flow therethrough and through the inlets and through the feed lines. The general operation of the system of this invention as described hereinabove is substantially the same as that discussed above in connection with the embodiment of the invention illustrated in Figures 1, 2 and 3. This even includes the operation of the overpressure relief valve 212 providing for overpressure relief between the control fluid at the relief valve block 188 and the outlet chamber 145.

In Figures 6, 7 and 8 there is shown a flow proportioner having many of the structural characteristics and utilizing substantially the same parts as those utilized in the flow equalizer of Figures 1, 2 and 3. That is, the flow proportioner of Figures 6, 7 and 8 uses the same outlet or discharge chamber housing 13 and the same housing body 12 inclosing inlet chambers 19 and 20 with passages 29 and 30 leading from the inlet chambers 19 and 20 to the outlet or discharge chamber 31. The operating mechanism, including the control fluid chambers and the bellows-actuated valves and the structure pertinent thereto are the same as that of Figures 1, 2 and 3 and, therefore, have not been reillustrated here. The modifications from the structure of Figures 1, 2 and 3 lie only in the provision of a further passage 29' between the inlet chamber 19 and the discharge chamber 31 through a portion of the wall 21 separating the inlet chambers 19 and 20. Additionally, an overpressure relief valve for fluid in the inlet chamber 19 is provided at 39' for the supplementary passage 29' as discussed in detail hereinbelow. Also, the control fluid inlet 113 has been moved to extend into the housing body 12 rather than into the discharge chamber housing 13 with the added modification that the discharge side of the pressure relief valve 128 leads to a passage 128' for flow to the discharge chamber 31.

At the metering orifices, provided between the inlet chambers 19 and 20 and the outlet chamber 31, in this flow proportioner, flow metering orifices 34' and 35', respectively, are provided in the passages 29 and 30 and are locked in place my snap rings or the like. These flow metering orifices 34' and 35' are of different orifice dimensions which, for example, may be of a ratio of 3.6 to 1.0 whereby when a condition exists such that there is equal pressure drops across these orifices, there will be flow rates therethrough in the proportion or ratio also of 3.6 to 1.0. Such flow proportioning in this control will thereby cause fuel in the feed lines leading to the inlet chambers 19 and 20 also to flow at the same proportion with the greater fuel flow existing in the inlet chamber 20 and through the larger metering orifice 35', while the lesser fuel flow exists in the inlet chamber 19 and through the smaller metering orifice 34'. Control of the fuel flow or other fluid flow will be effected in the same manner as that described hereinabove in conjunction with Figures 1, 2 and 3 since the flow rate ratio will be maintained when there is equal pressure drops across the flow metering orifices, or equal fluid pressures in the inlet chambers 19 and 20 since the outlet sides of the metering orifices 34' and 35' are at the same fluid pressure which is outlet chamber fluid pressure.

In the event of extreme overpressure in the inlet chamber 19, such as may exist by fuel line or booster pump failure for the feed line leading to the inlet chamber 20, there is provided an additional flaw passage and relief check valve 29' and 39' from the inlet chamber 19 to the discharge chamber 31 so as to provide for an increase in the flow rate from the chamber 19 to the chamber 31 and to provide for pressure relief in the inlet chamber 19. The relief check valve 39' includes a mounting plate 39" fixed onto the wall 21 and having a pair of ears 43' carrying a hinge pin 42'. A valve plate 44' having ears 45' thereon is hingedly carried on the hinge pin 42' and is biased towards closing the passage 29' by a spring 50' wrapped on the hinge pin 42' with its ends engaging the plate 39" at an intermediate portion thereof engaging the plate 44'. The plate 44' carries a valve head member 46' with a backing plate 47' to engage seating faces 49' on the wall 21 for closing the passage 29', the head member 46' and the backing plate 47' being secured to the plate 44' by rivets or the like 48'. The spring 50' is of sufficient strength to maintain the by-pass passage 29' closed except for excessive overpressure conditions in the inlet chamber 19'.

From the foregoing, it will be readily observed that numerous modifications and variations may be made without departing from the true spirit and scope of the novel concepts and principles of this invention wherein any of the embodiments herein disclosed and described may be modified with parts thereof interchanged to cause the same to be flow proportioners of flow equalizers, as desired.

I, therefore, intend to cover all such modifications and variations as fall within the true spirit and scope of the novel concepts and principles of this invention.

I claim as my invention:

1. A flow control mechanism to control flow from a plurality of feed lines to a main line comprising a housing, a plurality of inlets to said housing to be connected to the feed lines, an outlet from said housing to be connected to the main line, individual inlet chambers and an outlet chamber in said housing for said inlets respectively and said outlet, a reference fluid inlet to said housing, and a reference fluid chamber for said reference fluid inlet in said housing, a plurality of flow paths between said reference fluid inlet and said reference fluid chamber, and a flow path from each of said indivdual inlet chambers to said reference fluid chamber, a reference fluid control member in said reference fluid chamber for controlling said reference fluid and controlled by fluid from each of said individual inlet chambers, and a valve assembly to control fluid flow into each of said individual inlet chambers, said reference fluid flowing to said reference fluid chamber through said valve assembly and said valve assembly being controlled by reference fluid as controlled at said reference fluid chamber to maintain fluid pressures in said individual inlet chambers substantially equal.

2. A flow control mechanism to control flow from a plurality of feed lines to a main line comprising a housing, a plurality of inlets to said housing to be connected to the feed lines, an outlet from said housing to be connected to the main line, individual inlet chambers and an outlet chamber in said housing for said inlets respectively and said outlet, flow metering orifice means communicating each of said inlet chambers with said outlet, interconnected valve mechanisms at each of said inlets, pressure-sensing means sensing pressure in each of said inlet chambers, control fluid inlet means in said housing, and means communicating said control fluid inlet means with said pressure sensing means and with each of said valve mechanisms, said pressure sensing means controlling control fluid pressure in each of said valve mechanisms to actuate said valve mechanisms to maintain fluid pressures in said inlet chambers substantially equal.

3. A flow controller to maintain controlled fluid flow from a pair of feed lines to a main line comprising a housing having an outlet to the main line and a pair of inlets from the feed lines respectively, a pair of inlet fluid chambers in said housing for said inlets respectively, an outlet fluid chamber in said housing for said outlet, a flow orifice between each of the inlet chambers and the outlet chamber, a bellows-operated valve in each of said inlet chambers, a common valve stem for the bellows-operated valves, a control fluid chamber in said housing, a flexible diaphragm in said control fluid chamber sealingly dividing the same into a pair of pressure chambers, a pair of pressure relief nozzles in said pressure chambers respectively to be variably opened and closed by flexure of said diaphragm, a pair of fluid passages from said inlet chambers to said pressure chambers respectively, a control fluid inlet in said housing, control fluid passages in said housing from said control fluid inlet to the bellows-operated valves respectively, and passages from the bellows-operated valves to said pressure relief nozzles, whereby fluid pressure in said inlet chambers effects control of the bellows-operated valves to maintain substantially equal pressure drops across the flow orifices.

4. A flow controller to maintain controlled fluid flow from a pair of feed lines to a main line comprising a housing having an outlet to the main line and a pair of inlets from the feed lines respectively, a pair of inlet fluid chambers in said housing for said inlets respectively, an outlet fluid chamber in said housing for said outlet, a flow orifice between each of the inlet chambers and the outlet chamber, said flow orifices having a predetermined ratio of areas, a bellows-operated valve in each of said inlet chambers, a common valve stem for the bellows-operated valves, a control fluid chamber in said housing, a flexible diaphragm in said control fluid chamber sealingly dividing the same into a pair of pressure chambers, a pair of pressure relief nozzles in said pressure chambers respectively to be variably opened and closed by flexure of said diaphragm, a pair of fluid passages from said inlet chambers to said pressure chambers respectively, a control fluid inlet in said housing, control fluid passages in said housing from said control fluid inlet to the bellows-operated valves respectively, and passages from the bellows-operated valves to said pressure relief nozzles, whereby fluid pressure in said inlet chambers effects control of the bellows-operated valves to maintain substantially equal pressure drops across the flow orifices and thereby maintain flow rates through said orifices in a ratio substantially equal to the ratio of areas of said orifices.

5. A flow controller to maintain controlled fluid flow from a pair of feed lines to a main line comprising a housing having an outlet to the main line and a pair of inlets from the feed lines respectively, a pair of inlet fluid chambers in said housing for said inlets respectively, an outlet fluid chamber in said housing for said outlet, a flow orifice between each of the inlet chambers and the outlet chamber, a bellows-operated valve in each of said inlet chambers, a common valve stem for the bellows-operated valves, a spring-biased valve head at each end of said valve stem operable to cooperate with each of said inlets respectively, a control fluid chamber in said housing, a flexible diaphragm in said control fluid chamber sealingly dividing the same into a pair of pressure chambers, a pair of pressure relief nozzles in said pressure chambers respectively to be variably opened and closed by flexure of said diaphragm, a pair of fluid passages from said inlet chambers to said pressure chambers respectively, a control fluid inlet in said housing, control fluid passages in said housing from said control fluid inlet to the bellows-operated valves respectively, and passages from the bellows-operated valves to said pressure relief nozzles, whereby fluid pressure in said inlet chambers effects control of the bellows-operated valves to maintain substantially equal pressure drops across the flow orifices.

6. A flow controller to maintain controlled fluid flow from a plurality of feed lines to a main line comprising a housing having an outlet to the main line and a plurality of inlets from the feed lines respectively, fixed flow-metering orifices secured in said housing between said inlets and said outlet, means to sense fluid pressure at each of the inlets, control fluid actuatable valve means at each of said inlets means to supply a pressurized control fluid to said valve means, and a control fluid inlet to said valve means and to said fluid pressure sensing means whereby said fluid pressure sensing means controls control fluid pressure to in turn control actuation of said valve means to maintain substantially equal fluid pressures at said inlets.

7. A flow control mechanism to control flow from a plurality of feed lines to a main line comprising a housing, a plurality of inlets to said housing to be connected to said feed lines, an outlet from said housing to be connected to the main line, individual inlet chambers and an outlet chamber in said housing for said inlets, respectively, and said outlet, flow metering orifice means communicating each of said inlet chambers with said outlet chamber, a reference fluid inlet in said housing and a reference fluid chamber, a plurality of flow paths between said reference fluid inlet and said reference fluid chamber and a flow path from each of said individual inlet chambers to said reference fluid chamber, a reference fluid control member in said reference fluid chamber controlled by fluid from each of said individual inlet chambers, and a valve assembly to control fluid flow from said inlets into each of said individual inlet chambers, said plurality of flow paths including conduit means affording flow of said reference fluid through said valve assembly to said reference fluid chamber, said reference fluid controlling said valve assembly via said conduit means in accordance with control provided by said reference fluid control member, whereby to maintain fluid pressures in said individual inlet chambers in a desired proportionate relationship.

8. In a flow controller to maintain controlled flow from a plurality of feed lines to a main line comprising a housing having an outlet to the main line and a plurality of inlets from the feed lines respectively, means to sense fluid pressure at each of the inlets, valve means at each of the inlets, said valve means being controlled by the fluid pressure-means to maintain substantially a desired proportionate fluid pressure at said inlets, each of said valve means being movable toward the inlet associated therewith upon failure of fluid pressure at the other inlet, and spring biased members for each of said valve means rendering said valve means responsive to pressure at said inlets to prevent complete closing of the inlets by said valve means.

9. A flow control mechanism to control flow from a plurality of feed lines to a main line comprising a housing, a pair of inlets to said housing to be connected to the feed lines, an outlet from said housing to be connected to the main line, flow metering orifice means communicating each of said inlets with said outlets, pressure-sensing means responsive to pressure from each of said inlets respectively, valve means for said inlets operative to maintain fluid flow through said flow metering orifice means at a predetermined ratio therebetween including shaft means, valve elements at opposite ends of said shaft means and bellows means for effecting slidable and reciprocable movement of said shaft means and valve means in said housing, and fluid linkage means connecting said pressure-sensing means and said bellows means including conduit means having nozzle means differentially controlled by said pressure-sensing means.

10. A flow control mechanism to control flow from a plurality of feed lines to a main line comprising a housing, a pair of inlet to said housing to be connected to the feed lines, an outlet from said housing to be connected to the main line, walls in said housing defining individual inlet chambers and an outlet chamber therein for said inlets respectively and said outlet, orifice means communicating each of said inlet chambers with the outlet chamber, means simultaneously sensing the fluid pressure in each of said inlet chambers, valve means for each of said inlets, shaft means joining each of said valve means, fluid linkage means for each of said valve means controlled by said means simultaneously sensing the pressure in each of said inlet chambers adjusting the axial position of said shaft means in accordance with the net differential of the effect on said shaft means of each of said linkage means for said valve means, each of said valve means tending to close the inlet therefor in response to failure of pressure at the other inlet, and spring means for each of said valve means rendering said valve means responsive to fluid pressure thereagainst to maintain fluid flow through the control mechanism despite failure of fluid pressure at the other inlet.

References Cited in the file of this patent

UNITED STATES PATENTS

| | | |
|---|---|---|
| 682,688 | Hart | Sept. 17, 1901 |
| 962,111 | Assmann | June 21, 1910 |
| 2,313,797 | Bailey | Mar. 16, 1943 |
| 2,643,663 | Gold | June 30, 1953 |
| 2,763,279 | Godden et al. | Sept. 18, 1956 |

FOREIGN PATENTS

| | | |
|---|---|---|
| 157,362 | Australia | July 1, 1954 |